United States Patent
Noviello (10) Patent No.: US 7,974,914 B2
(45) Date of Patent: *Jul. 5, 2011

(54) SYSTEM AND METHOD FOR MANAGING TRADING ORDERS WITH DECAYING RESERVES

(75) Inventor: Joseph C. Noviello, New York, NY (US)

(73) Assignee: BGC Partners, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/685,999

(22) Filed: Jan. 12, 2010

(65) Prior Publication Data

US 2010/0174619 A1 Jul. 8, 2010

Related U.S. Application Data

(63) Continuation of application No. 12/106,494, filed on Apr. 21, 2008, now Pat. No. 7,716,122.

(51) Int. Cl.
G06Q 40/00 (2006.01)

(52) U.S. Cl. .......................................................... 705/37

(58) Field of Classification Search .................. 235/385; 370/236, 254, 352; 396/60; 700/35, 95, 700/231, 235; 704/60; 705/1–45, 50, 80; 710/29; 716/1; 717/106, 162

See application file for complete search history.

(56) References Cited

U.S. PATENT DOCUMENTS

| | | | | |
|---|---|---|---|---|
| 5,915,245 A | * | 6/1999 | Patterson et al. | 705/35 |
| 7,020,632 B1 | * | 3/2006 | Kohls et al. | 705/37 |
| 7,680,722 B2 | * | 3/2010 | Bok et al. | 705/37 |
| 7,702,569 B1 | * | 4/2010 | Tanpoco | 705/37 |
| 7,716,122 B2 | | 5/2010 | Noviello | |
| 7,747,498 B2 | | 6/2010 | Noviello | |
| 2002/0178104 A1 | | 11/2002 | Hausman | |
| 2003/0101125 A1 | | 5/2003 | McGill | |
| 2003/0126065 A1 | | 7/2003 | Eng et al. | |
| 2004/0034591 A1 | * | 2/2004 | Waelbroeck et al. | 705/37 |
| 2004/0143538 A1 | | 7/2004 | Korhammer et al. | |
| 2004/0215538 A1 | | 10/2004 | Smith et al. | |
| 2005/0075963 A1 | | 4/2005 | Balabon | |
| 2005/0108125 A1 | | 5/2005 | Goodwin et al. | |
| 2006/0026090 A1 | | 2/2006 | Balabon | |
| 2006/0080215 A1 | * | 4/2006 | Warsaw et al. | 705/37 |
| 2006/0136318 A1 | | 6/2006 | Rafieyan et al. | |
| 2006/0224494 A1 | | 10/2006 | Pinkava | |
| 2007/0027797 A1 | | 2/2007 | Claus et al. | |
| 2007/0130050 A1 | | 6/2007 | Claus et al. | |
| 2007/0219898 A1 | * | 9/2007 | Burkhardt et al. | 705/37 |
| 2007/0244792 A1 | * | 10/2007 | Couperier et al. | 705/37 |
| 2008/0162378 A1 | * | 7/2008 | Levine et al. | 705/36 R |

(Continued)

OTHER PUBLICATIONS

U.S. Appl. No. 12/603,544, filed Oct. 21, 2009, Noviello.

(Continued)

*Primary Examiner* — Mary Cheung
*Assistant Examiner* — Tien C Nguyen (57) ABSTRACT

A system comprises a memory operable to store a trading order for a particular quantity of a trading product, wherein a first portion of the particular quantity is a displayed quantity and a second portion of the particular quantity is a reserved quantity. The system further comprises a processor communicatively coupled to the memory and operable to disclose the displayed quantity to one or more market centers. The processor is further operable to identify a decay rate associated with the trading order. The processor is further operable to cause the reserved quantity to decay based at least in part on the identified decay rate.

66 Claims, 4 Drawing Sheets

U.S. PATENT DOCUMENTS

| | | |
|---|---|---|
| 2008/0256001 A1 | 10/2008 | McGill |
| 2009/0018944 A1 | 1/2009 | De Verdier |
| 2009/0265282 A1 | 10/2009 | Noviello |
| 2010/0049648 A1 | 2/2010 | Noviello |

OTHER PUBLICATIONS

Notification of Transmittal of the International Search Report and the Written Opinion of the International Searching Authority, or the Declaration for International Application No. PCT/US09/41131; 9 pages; Date: May 19, 2009.

USPTO Office Action for U.S. Appl. No. 12/106,494, Apr. 3, 2009 (8 pages).

USPTO Examiner Interview Summary for U.S. Appl. No. 12/106,494, Jul. 31, 2009 (2 pages).

USPTO Notice of Allowance for U.S. Appl. No. 12/106,494, Oct. 29, 2009 (25 pages).

Market Structure Massacre? Marks, Jim, Traders Magazine pp. 26, Mar. 1, 2002 (2 pages).

Townsend Analytics, Ltd. Releases New Version of RealTick(TM), PR Newswire, p NA, Oct. 16, 2000 (3 pages).

USPTO Examiner Interview Summary for U.S. Appl. No. 12/603544, Dec. 28, 2009 (4 pages).

USPTO Supplemental Notice of Allowance for U.S. Appl. No. 12/106,494, Apr. 5, 2010 (2 pages).

U.S. Appl. No. 12/780,178, filed May 14, 2010, Noviello.

USPTO Examiner Interview Summary for U.S. Appl. No. 12/603,544, Feb. 26, 2010 (4 pages).

USPTO Notice of Allowance and Fees Due for U.S. Appl. No. 12/603,544, Feb. 16, 2010 (20 pages).

USPTO Examiner Interview Summary for U.S. Appl. No. 12/780,178, Oct. 27, 2010 (4 pages).

International Preliminary Report on Patentability for International Application No. PCT/US09/41131, Oct. 26, 2010 (7 pages).

U.S. Appl. No. 12/950,111, filed Nov. 19, 2010, Inventor: Joseph C. Noviello, entitled "System And Method For Managing Trading Orders With Decaying Reserves" (30 pages).

Notification of Transmittal of the International Search Report and the Written Opinion of the ISA for International Application No. PCT/US10/53526, dated Dec. 16, 2010 (7 pages).

\* cited by examiner

FIG. 1

DECAY RULE: REDUCE RESERVED QUANTITY BY 20,000,000 UNITS/MINUTE — 72

| TIME | TRADING ORDER | TRADING PRODUCT | TOTAL QUANTITY | PRICE PER UNIT | DISPLAYED QUANTITY | RESERVED QUANTITY |
|---|---|---|---|---|---|---|
| 10:26:02 | BID A | SECURITY X | 100,000,000 | $2.00 | 10,000,000 | 90,000,000 |
|  | BID A | SECURITY X | 90,000,000 | $2.00 | 10,000,000 | 80,000,000 |
| 10:27:02 | BID A | SECURITY X | 70,000,000 | $2.00 | 10,000,000 | 60,000,000 |
| 10:28:02 | BID A | SECURITY X | 50,000,000 | $2.00 | 10,000,000 | 40,000,000 |
| 10:29:02 | BID A | SECURITY X | 30,000,000 | $2.00 | 10,000,000 | 20,000,000 |
| 10:30:02 | BID A | SECURITY X | 10,000,000 | $2.00 | 10,000,000 | 0 |

12a → 202 → 204 → 206 → 208
66, REPLENISH, MATCH

| TIME | COUNTERORDER | TRADING PRODUCT | QUANTITY | PRICE |
|---|---|---|---|---|
| 10:26:34 | OFFER B | SECURITY X | 10,000,000 | $2.00 |

DECAY RULE: REDUCE RESERVED QUANTITY AT RATE OF 10T (T = ELAPSED MINUTES SINCE RECEIPT OF ORDER)

| TIME | TRADING ORDER | TRADING PRODUCT | TOTAL QUANTITY | DISPLAYED QUANTITY | RESERVED QUANTITY |
|---|---|---|---|---|---|
| 11:42:12 | BID A | SECURITY Y | 100 | 10 | 90 |
| 11:43:12 | BID A | SECURITY Y | 90 | 10 | 80 |
| 11:44:12 | BID A | SECURITY Y | 70 | 10 | 60 |
| 11:45:12 | BID A | SECURITY Y | 40 | 10 | 30 |
| 11:46:12 | BID A | SECURITY Y | 10 | 10 | 0 |

SYSTEM AND METHOD FOR MANAGING TRADING ORDERS WITH DECAYING RESERVES

CROSS-REFERENCE TO RELATED APPLICATIONS

The present application is a continuation of U.S. patent application Ser. No. 12/106,494, which was filed Apr. 21, 2008 now U.S. Pat. No. 7,716,122, and which is hereby incorporated by reference herein in its entirety.

TECHNICAL FIELD OF THE INVENTION

The present invention relates generally to electronic trading and more specifically to a system and method for managing trading orders with decaying reserves.

BACKGROUND OF THE INVENTION

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

SUMMARY OF THE INVENTION

In accordance with the present invention, the disadvantages and problems associated with prior electronic trading systems have been substantially reduced or eliminated.

In some embodiments, a system comprises a memory operable to store a trading order for a particular quantity of a trading product, wherein a first portion of the particular quantity is a displayed quantity and a second portion of the particular quantity is a reserved quantity. The system further comprises a processor communicatively coupled to the memory and operable to disclose the displayed quantity to one or more market centers. The processor is further operable to identify a decay rate associated with the trading order. The processor is further operable to cause the reserved quantity to decay based at least in part on the identified decay rate.

Various embodiments of the present disclosure may benefit from numerous advantages. It should be noted that one or more embodiments may benefit from some, none, or all of the advantages discussed below.

One advantage is that a trading system may allow a trader to submit a trading order comprising a displayed quantity and a reserved quantity. The trading system may disclose the displayed quantity to multiple market centers while preventing the disclosure of the reserved quantity. In some embodiment, the trading system causes the reserved quantity of the trading order to decay over time. The trading system may thereby reduce certain risks associated with market volatility. In particular, by causing the reserved quantity to decay, the trading system may reduce the trader's risk of having exposure for a stale trading order with a price that is no longer favorable for the trader.

Another advantage is that, by causing the reserved quantity of trading order to decay, the trading system may improve system efficiency. In particular, as trading orders with reserved quantities are not aggressed, trading system may gradually delete the reserved quantities of such trading orders from one or more order books. Deleting portions of such trading orders may free up memory and processing resources in the trading system. Trading system may thereby improve data throughput and/or conserve system resources.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
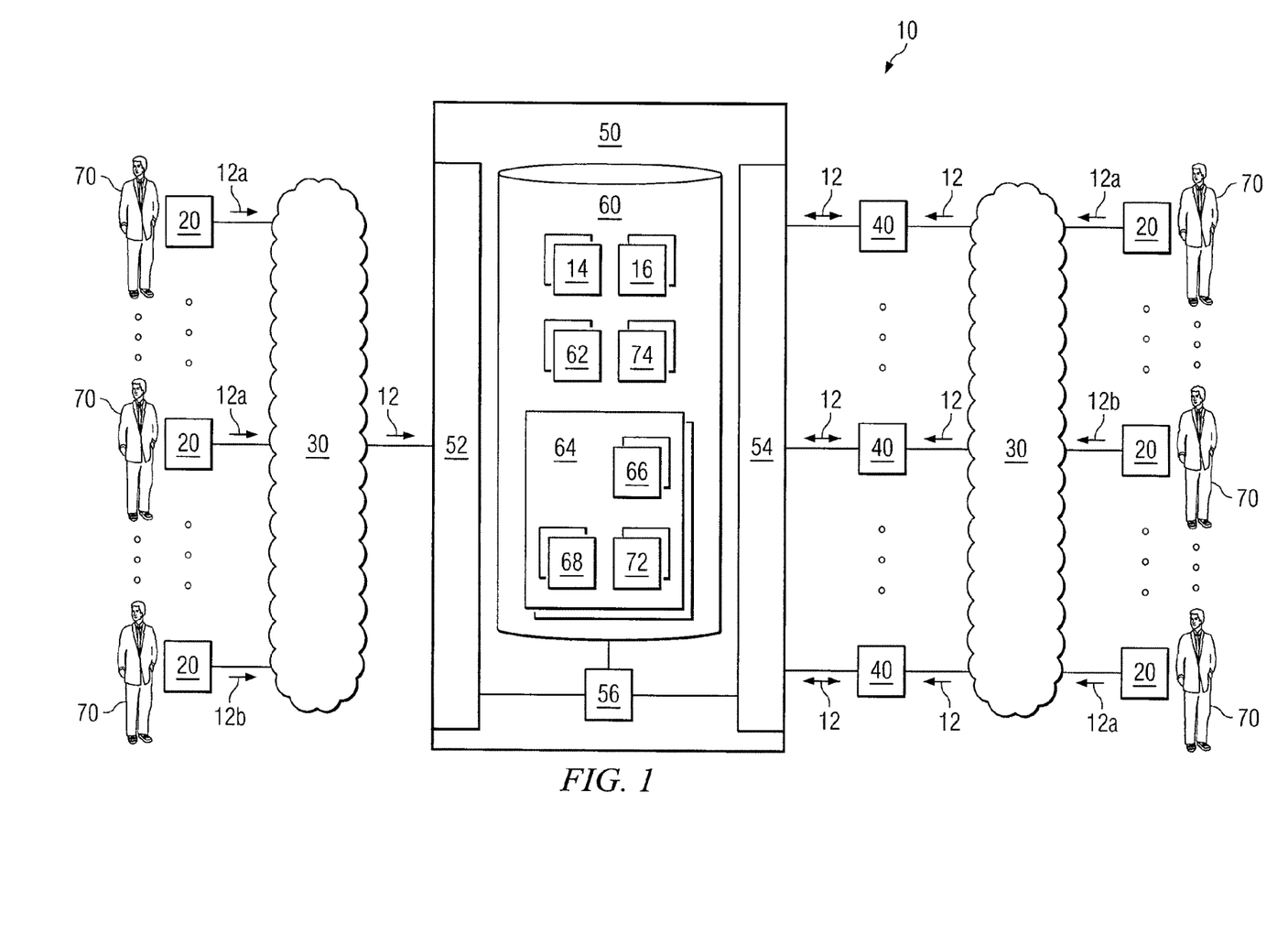
FIG. 1 illustrates one embodiment of a trading system in accordance with the present invention.

FIG. 1 illustrates one embodiment of a trading system 10. Generally, trading system 10 comprises a trading platform 50 communicatively coupled to clients 20, networks 30, and market centers 40. Trading platform 50 may receive and process trading orders 12 from traders 70. In some embodiments, trading platform 50 may cause a portion of trading order 12 to decay over time. Trading platform 50 may thereby reduce certain risks associated with market volatility. In particular, by causing a portion of trading order 12 to decay, trading platform 50 may reduce the risks of having exposure to a stale trading order 12 with a price that has become unfavorable.

A given trading order 12 may comprise two parts—a "displayed quantity" and a "reserved quantity." In placing trading order 12, trader 70 may indicate that only a portion of the total quantity of trading order 12 should be displayed to other traders 70. This portion of trading order 12 to be displayed to other traders 70 is referred to as the "displayed quantity." The remaining portion of trading order 12 is referred to as the "reserved quantity." Designating a portion of trading order 12 as a "reserved quantity" allows trader 70 to enter a large trading order 12 while only displaying a portion of that trading order 12 to other traders 70. Trading platform 50 may incrementally fill a particular trading order 12 by first filling the displayed quantity of that trading order 12 and then using the reserved quantity to replenish the displayed quantity of that trading order 12.

Trading orders 12 generally comprise orders 12a and counterorders 12b. Orders 12a and counterorders 12b may be buy orders 14 and sell orders 16. Orders 12a and counterorders 12b are complementary actions such as, for example, buying and selling. If an order 12a refers to a buy order 14, then a counterorder 12b refers to a sell order 16. Conversely, if an order 12a refers to a sell order 16, then a counterorder 12b refers to a buy order 14. A buy order 14 is a request to buy a particular quantity of a particular trading product (e.g., bid request). A sell order 16 is a request to sell a particular quantity of a particular trading product (e.g., offer request). In particular embodiments, trading order 12 may specify a target price (e.g., target bid price or target offer price) for the trading product. Although system 10 is exemplified below using equities as the trading product, the trading product that forms the basis of trading order 12 may comprise any goods, services, financial instruments, commodities, etc. Examples of financial instruments include, but are not limited to, stocks, bonds, and futures contracts.

Clients 20 are operable to receive trading orders 12 from traders 70 and to send trading orders 12 to trading platform 50 and/or market centers 40. Clients 20 comprise any suitable local or remote end-user devices that may be used by traders 70 to access one or more elements of trading system 10, such as trading platform 50. A particular client 20 may comprise a computer, workstation, telephone, Internet browser, electronic notebook, Personal Digital Assistant (PDA), pager, or any other suitable device (wireless or otherwise), component, or element capable of receiving, processing, storing, and/or communicating information with other components of system 10. Client 20 may also comprise any suitable user interface such as a display, microphone, keypad, keyboard, touch screen, or any other appropriate terminal equipment according to particular configurations and arrangements. It will be understood that there may be any number of clients 20 communicatively connected to trading platform 50. In addition, there may be any number of clients 20 communicatively connected to market centers 40 without using trading platform 50.

Although clients 20 are described herein as being used by "traders" 70, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 12 in system 10.

According to certain embodiments, traders 70 may include market makers. A market maker may include any individual or firm that submits and/or maintains either or both bid and offer trading orders 12 simultaneously for the same instrument. For example, a market maker may include an individual or firm, such as a brokerage or bank, that maintains either a firm bid and/or offer price in a given security by standing ready, willing, and able to buy and/or sell that security at publicly quoted prices. A market maker generally displays bid and/or offer prices for specific numbers of specific securities, and if these prices are met, the market maker will immediately buy for and/or sell from its own accounts. According to certain embodiments, a single trading order 12 may be filled by a number of market makers at potentially different prices.

Networks 30 are communication platforms operable to exchange data or information between clients 20 and trading platform 50 and/or market centers 40. According to certain embodiments, a particular network 30 may represent an Internet architecture which provides clients 20 with the ability to communicate trading or transaction information to trading platform 50 and/or market centers 40. According to certain embodiments, network 30 comprises a plain old telephone system (POTS), which traders 70 may use to perform the same operations and functions. Transactions may be assisted by a broker associated with trading platform 50 or manually keyed into a telephone or other suitable electronic device to request that a transaction be executed. In certain embodiments, network 30 may be any packet data network (PDN) offering a communications interface or exchange between any two nodes in system 10. Network 30 may comprise any combination of local area network (LAN), metropolitan area network (MAN), wide area network (WAN), wireless local area network (WLAN), virtual private network (VPN), intranet, or any other appropriate architecture or system that facilitates communications between clients 20 and trading platform 50 and/or market centers 40.

Market centers 40 comprise all manner of order execution venues including exchanges, Electronic Communication Networks (ECNs), Alternative Trading Systems (ATSs), market makers, or any other suitable market participants. Each market center 40 maintains a bid and offer price for a given trading product by standing ready, willing, and able to buy or sell that trading product at publicly quoted prices, also referred to as market center prices. Different market centers 40 may provide different market center prices for particular trading products. For example, a particular market center 40 may offer a particular bid price and/or offer price for a particular trading product, while another market center 40 may offer a different bid price and/or offer price for the same trading product. A particular market center 40 may charge a transaction cost to execute trading orders 12 that remain in the order books of that market center 40 for more than a certain length of time. Different market centers 40 may have different policies regarding the disclosure of various details of trading orders 12. For example, certain market centers 40 referred to as "cooperative" market centers may disclose both the displayed quantities and the reserved quantities of trading orders 12 to trading platform 50. Other market centers 40 referred to as "non-cooperative" market centers may disclose only the displayed quantities of trading orders 12 to trading platform 50.

Trading platform 50 is a trading architecture that facilitates the routing, matching, and otherwise processing of trading orders 12. Trading platform 50 may comprise a management center or a headquartering office for any person, business, or entity that seeks to route, allocate, match, process, or fill trading orders 12. Accordingly, trading platform 50 may include any suitable combination of hardware, software, personnel, devices, components, elements, or objects that may be utilized or implemented to achieve the operations and functions of an administrative body or a supervising entity that manages or administers a trading environment. In certain embodiments, trading platform 50 comprises client interface 52, market interface 54, processor 56, and memory module 60.

Client interface 52 of trading platform 50 is communicatively coupled to network 30 and supports communications between clients 20 and the various components of trading platform 50. According to certain embodiments, client interface 52 comprises a transaction server that receives trading orders 12 communicated by clients 20 via network 30.

Market interface 54 is communicatively coupled to market centers 40 and supports communications between market centers 40 and the various components of trading platform 50. Market interface 54 may comprise a transaction server that receives trading orders 12 communicated by market centers 40. Market interface 54 may be operable to send to market centers 40 trading orders 12 received from clients 20 connected directly to trading platform 50.

Client interface 52 and market interface 54 are communicatively coupled to processor 56. Processor 56 is operable to record trading orders 12 in memory module 60 and route trading orders 12 to market centers 40. Processor 56 is further operable to execute logic 62 stored in memory module 60 to match buy orders 14 and sell orders 16 received by client interface 52 and market interface 54. In addition, processor 56 is operable to incrementally fill a particular trading order 12 by using the reserved quantity of that trading order 12 to replenish the displayed quantity of that trading order 12. In some embodiments, processor 56 may cause the reserved quantity of trading order 12 to decay over time. Processor 56 may comprise any suitable combination of hardware and software implemented in one or more modules to provide the described function or operation.

Memory module 60 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates memory module 60 as internal to trading platform 50, it should be understood that memory module 60 may be internal or external to components of trading system 10, depending on particular implementations. Also, memory module 60 illustrated in FIG. 1 may be separate or integral to other memory devices to achieve any suitable arrangement of memory devices for use in trading system 10.

According to certain embodiments, memory module 60 stores logic 62 and trader profiles 64. Logic 62 generally comprises software instructions for routing, matching, processing, or filling trading orders 12. Processor 56 is operable to execute logic 62 in memory module 60 to match buy orders 14 and sell orders 16 and to determine the priority of traders 70 associated with those buy orders 14 and sell orders 16.

Memory module 60 may store a respective trader profile 64 for each trader 70 in trading system 10. Trader profile 64 for a particular trader 70 may comprise the name, account information, trading preferences, trade history, and/or other suitable information associated with the particular trader 70. In some embodiments, trader profile 64 comprises one or more decay rules 66. Processor 56 may execute decay rule 66 to determine the rate and/or frequency at which to reduce the reserved quantity of trading order 12. Decay rule 66 may specify an amount by which the reserved quantity of trading order 12 should decay over time. For example, decay rule 66 may direct processor to reduce the reserved quantity of trading order 12 by one thousand units per minute. By reducing the reserved quantity of trading order 12 over time, processor may reduce the risks associated with having a stale trading order 12 in a volatile market. In some embodiments, a particular decay rule 66 may be associated with a decay interval 68 and a decay rate 72 (described below with respect to FIG. 2).

It should be understood that the internal structure of trading platform 50 and the interfaces, processors, and memory devices associated therewith is malleable and can be readily changed, modified, rearranged, or reconfigured in order to achieve the intended operations of trading platform 50.

In operation, trading platform 50 is operable to receive trading order 12 from client 20. Trading order 12 may be for a particular quantity of a particular trading product (e.g., equities, commodities, futures, currencies, bonds, and so forth). In some embodiments, trading order 12 designates a portion of the particular quantity as a displayed quantity. Trading order 12 may designate another portion of the particular quantity of trading order 12 as the reserved quantity. Trading platform 50 may disclose the displayed quantity of trading order 12 to market center 40. In some embodiments, trading platform 50 prevents the disclosure of the reserved quantity of trading order 12 to market center 40.

Upon receiving trading order 12, processor 56 may identify decay rule 66 stored in memory module 60. Decay rule 66 may instruct processor 56 to reduce the reserved quantity of trading order 12 over time. Reducing the reserved quantity of trading order 12 may comprise deleting a portion of trading order 12 from one or more order books 74 in memory module 60. In some embodiments, the reduction of the reserved quantity of trading order 12 is based at least in part on decay rate 72 associated with decay rule 66.

Figure 2:
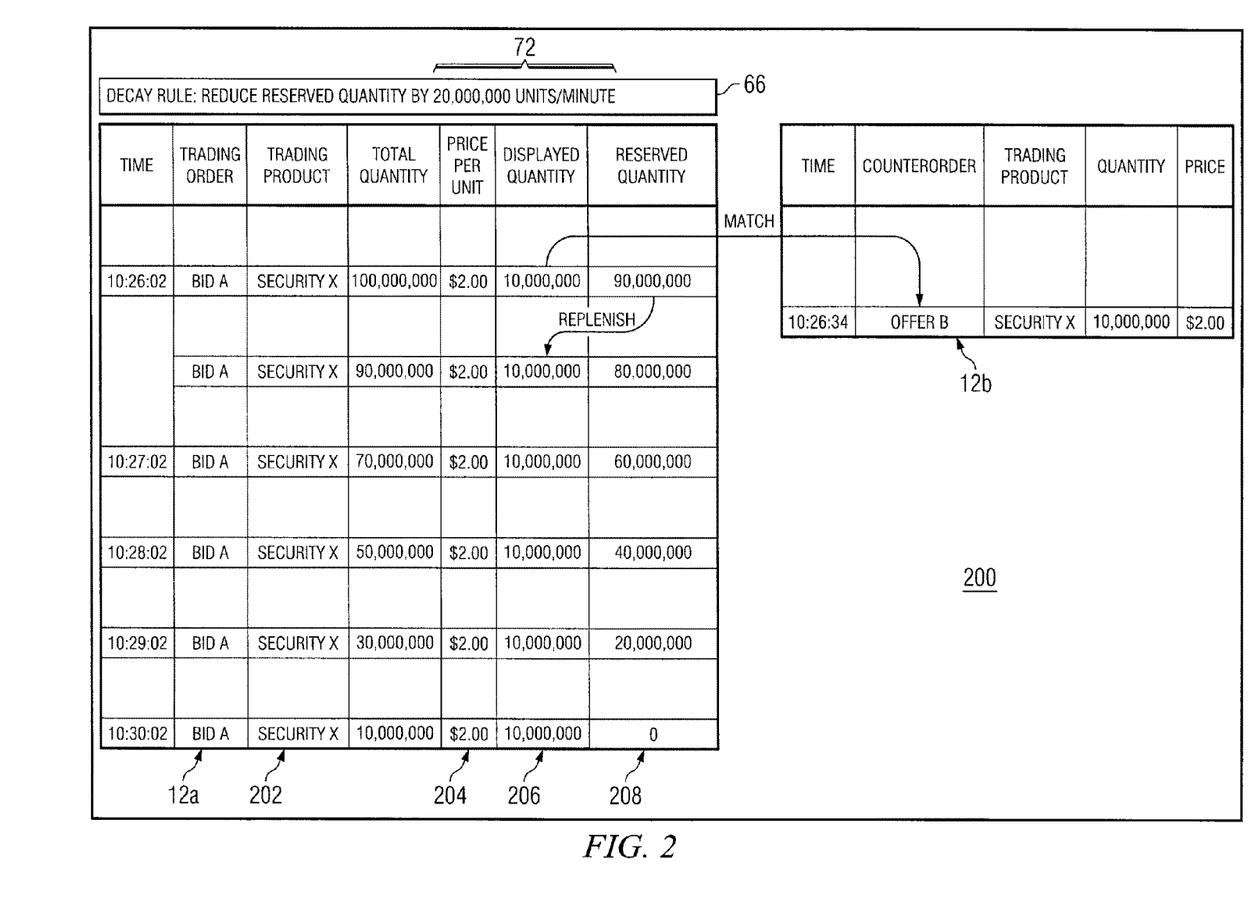
FIG. 2 illustrates decay of a trading order with a reserved quantity, according to certain embodiments.

FIG. 2 is a table 200 that sets forth an example illustrating the decay of trading order 12, according to certain embodiments. In this example, memory module 60 stores one or more decay rules 66 that cause the reserved quantity of trading order 12 to decay over time. As each successive interval of time expires, processor 56 may reduce the reserved quantity of trading order 12 by a configurable increment. The time intervals at which the reserved quantity decays may be referred to as decay intervals 68. The rate at which the reserved quantity decays may be referred to as decay rate 72. For example, decay rule 66 may specify that, at the expiration of each successive minute after trading platform 50 receives trading order 12, processor 56 reduces reserved quantity of trading order 12 by five million units. In this example, decay interval 68 is one minute and decay rate 72 is five million units/minute. Although the foregoing example illustrates decay interval 68 of one minute, it should be understood that decay interval 68 may be ten seconds, two minutes, ten minutes, and/or any suitable interval of time. Although the foregoing example illustrates decay rate 72 of five million units/minute, it should be understood that decay rate 72 may be one hundred units/second, one million units/minute, and/or any suitable rate.

In some embodiments, once processor 56 uses counterorder 12b to fill the displayed quantity of order 12a, processor 56 may replenish the displayed quantity of order 12a. In particular, processor 56 may be configured to use a portion of the reserved quantity of order 12a to replenish the displayed quantity of order 12a. In some embodiments, the filling and replenishing of the displayed quantity of order 12a occurs independently of the decay of the reserved quantity of order 12a.

The example order 12a in table 200 illustrates certain embodiments. In this example, trading platform 50 comprises decay rule 66 to reduce the reserved quantity of trading order 12 by twenty million units per minute. In this example, at 10:26:02 a.m., trading platform 50 receives Bid A from Trader A. Bid A is for one hundred million units of Security X at a price of two dollars per unit. The trading product and price associated with Bid A is illustrated in columns 202 and 204, respectively. Bid A has a displayed quantity of ten million units and a reserved quantity of ninety million units. The displayed quantity and reserved quantity of Bid A is illustrated in columns 206 and 208, respectively.

Upon receiving Bid A, processor 56 discloses the displayed quantity (i.e., ten million units) of Bid A to market centers 40. At 10:26:34 a.m., trading platform 50 receives Offer B, a matching counterorder 12b. Offer B is for ten million units of Security X at two dollars per unit. Upon receiving Offer B, processor 56 uses the ten million units from Offer B to fill the displayed quantity of Bid A. Processor 56 then uses ten million units from the reserved quantity of Bid A to replenish the displayed quantity of Bid A. Thus, the reserved quantity of Bid A becomes eighty million units.

In this example, trading platform 50 does not receive any other matching counterorders 12*b* prior to 10:27:02 a.m.—one minute after trading platform 50 received Bid A. According to decay rule 66, at 10:27:02 a.m., processor 56 reduces reserved quantity of Bid A from eighty million units to sixty million units. With the expiration of each successive minute, processor 56 continues to reduce reserved quantity of Bid A according to decay rule 66. By decaying the reserved quantity of Bid A over time, processor 56 may reduce certain risks associated with market volatility. In particular, by reducing the reserved quantity of Bid A over time, processor 56 may reduce the risk of Trader A having exposure for a stale trading order 12 with a price that is no longer favorable for Trader A.

In some embodiments, trading platform 50 may comprise different decay rules 66 for different traders 70. In particular, memory module 60 may store a respective trader profile 64 for each trader 70 in trading system 10. Trader profile 64 for a particular trader 70 may comprise one or more decay rules 66 that are configurable by that trader 70. In some embodiments, a particular trader profile 64 may comprise a first decay rule 66 for a first trading product, a second decay rule 66 for a second trading product, and so forth. Thus, a particular trader 70 may cause the reserved quantity of trading order 12 for a first trading product to decay at a different rate than the reserved quantity of trading order 12 for a second trading product. In some embodiments, upon receiving trading order 12, processor 56 identifies the particular trader 70 that submitted trading order 12. Processor 56 may then identify in memory module 60 trader profile 64 associated with the particular trader 70. Processor 56 may then retrieve the appropriate decay rule 66 from the identified trader profile 64. Thus, processor 56 may apply different decay rules 66 for different traders 70.

In some embodiments, decay rule 66 may specify an initial decay interval 68 that is longer or shorter than successive decay intervals 68. For example, a particular decay rule 66 may specify that, five minutes after trading platform 50 received trading order 12, processor 56 begins decaying the reserved quantity of trading order 12. After the initial five minute interval, the particular decay rule 66 may specify that processor 56 continue to decay the reserved quantity after each successive minute.

Decay rule 66 may comprise any suitable formula, table, algorithm, and/or instructions for reducing the reserved quantity of trading order 12. In some embodiments, decay rule 66 may comprise a formula for a variable decay rate 72.

Figure 3:
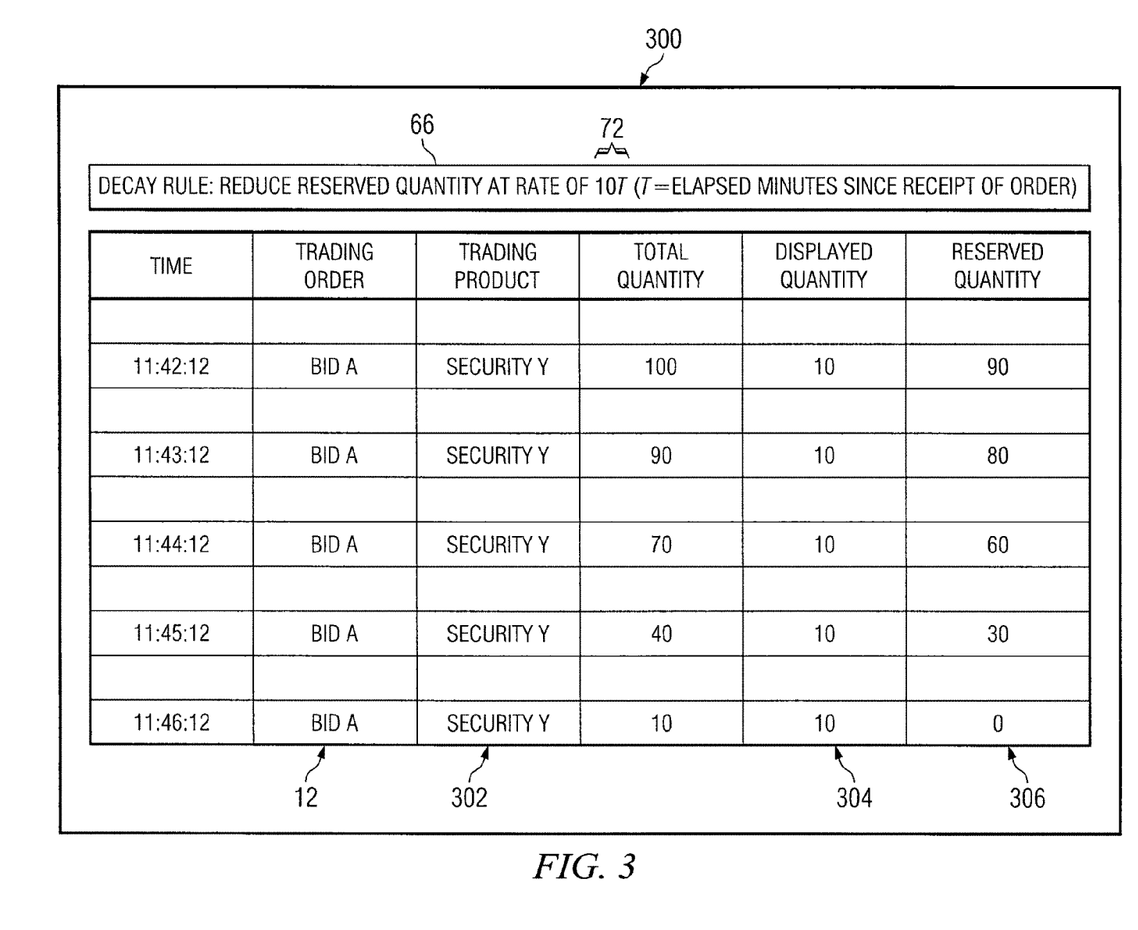
FIG. 3 illustrates decay of a trading order with a reserved quantity, according to certain embodiments.

FIG. 3 is a table 300 that sets forth an example illustrating variable rate decay of trading order 12, according to certain embodiments. In this example, decay rule 66 instructs processor 56 to decay the reserved quantity of trading order 12 at a rate of "10T" where "T" is the number of minutes since trading platform 50 received trading order 12. At 11:42:12 a.m., trading platform 50 receives Bid A for one hundred units of Security Y. Bid A comprises a displayed quantity of ten units and a reserved quantity of ninety units. The trading product, displayed quantity, and reserved quantity associated with Bid A are illustrated in columns 302, 304, and 306, respectively.

In this example, processor 56 reduces the reserved quantity of Bid A according to decay rule 66. In particular, at 11:43:12 a.m., processor 56 reduces the reserved quantity of Bid A by ten units (i.e., 10×1). At 11:44:12 a.m., processor 56 further reduces the reserved quantity of Bid A by twenty units (i.e., 10×2). With each successive minute, processor 56 reduces the reserved quantity of Bid A by an increasing amount according to decay rule 66. The decay of the reserved quantity may continue until the reserved quantity is eliminated. Thus, decay rule 66 may specify a variable decay rate 72.

Although the foregoing example illustrates decay rate 72 associated with a particular formula, it should be understood that decay rule 66 may comprise any suitable formula, table, algorithm, and/or instructions for reducing the reserved quantity of trading order 12 over time.

Figure 4:
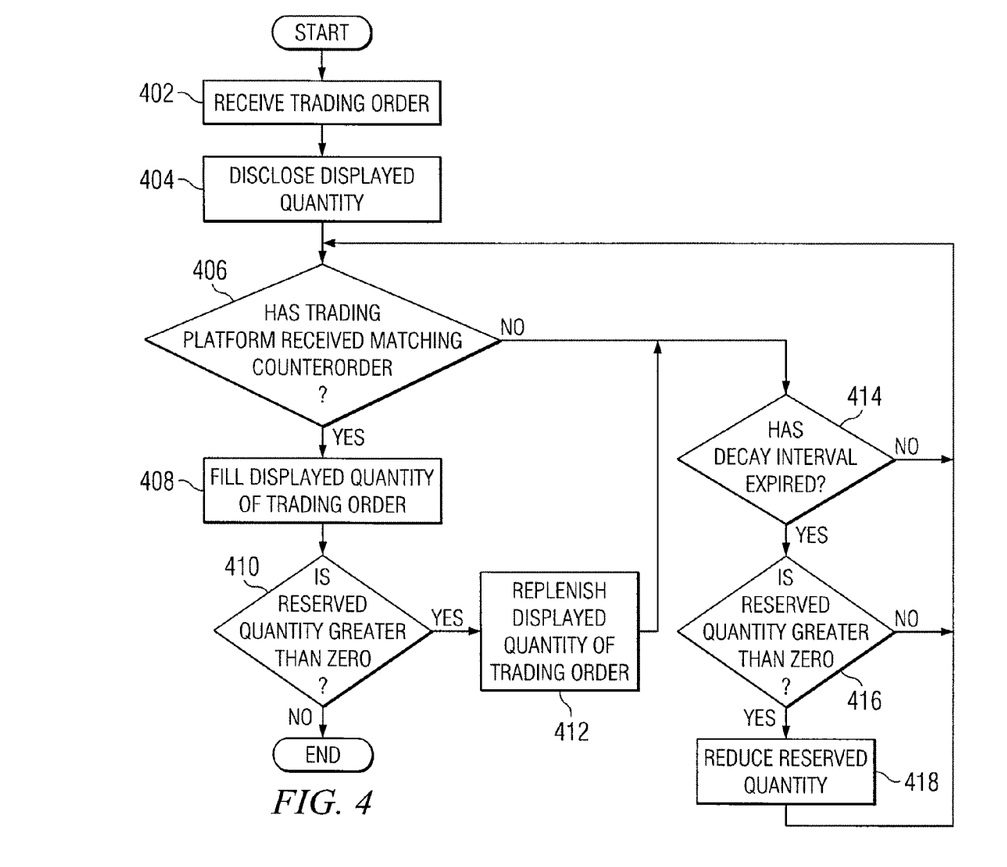
FIG. 4 illustrates a flowchart for managing a trading order with a reserved quantity, according to certain embodiments.

FIG. 4 illustrates a flowchart for managing trading orders 12, according to certain embodiments. The method begins at step 402 where trading platform 50 receives order 12*a* from client 20. Order 12*a* may be for a particular quantity of a trading product. A portion of the particular quantity of order 12*a* may be designated as a displayed quantity. The remaining portion of the particular quantity of order 12*a* may be designated as the reserved quantity. At step 404, trading platform 50 discloses the displayed quantity of order 12*a* to market centers 40. Disclosing the displayed quantity of order 12*a* may comprise transmitting data regarding the displayed quantity of order 12*a* to market centers 40.

At step 406, processor 56 determines whether trading platform 50 has received counterorder 12*b* that matches order 12*a*. In some embodiments, the determination of whether counterorder 12*b* matches order 12*a* is based at least in part on whether counterorder 12*b* and order 12*a* are for the same product, the same price, and/or or crossing prices. If processor 56 determines at step 406 that trading platform 50 has not received counterorder 12*b* that matches order 12*a*, then the method proceeds to step 414. However, if processor 56 determines at step 406 that trading platform 50 has received counterorder 12*b* that matches order 12*a*, then at step 408 processor 56 uses the counterorder 12*b* to fill the displayed quantity of order 12*a*. At step 410, processor 56 determines whether the reserved quantity of order 12*a* is greater than zero. If processor 56 determines at step 410 that the reserved quantity of order 12*a* is not greater than zero, then the method ends. However, if processor 56 determines at step 410 that the reserved quantity of order 12*a* is greater than zero, then at step 412 processor 56 uses a portion of the reserved quantity of order 12*a* to replenish the displayed quantity of order 12*a*. The method then proceeds to step 414.

At step 414, processor 56 determines whether decay interval 68 associated with decay rule 66 has expired. If processor 56 determines at step 414 that decay interval 68 has not expired, then the method returns to step 406. However, if processor 56 determines at step 414 that decay interval 68 has expired, then at step 416 processor 56 determines whether the reserved quantity of order 12*a* is greater than zero. If processor 56 determines at step 416 that the reserved quantity is not greater than zero, then the method returns to step 406. However, if processor 56 determines at step 416 that the reserved quantity is greater than zero, then at step 418 processor 56 reduces the reserved quantity of order 12*a* by a configurable amount according to decay rule 66. Decay rule 66 may comprise any suitable formula, table, algorithm, and/or instructions for reducing the reserved quantity of order 12*a* over time. Decay rule 66 may specify any suitable length of decay interval 68 and/or may specify any suitable decay rate 72. After processor 56 reduces the reserved quantity of order 12*a* at step 418, the method returns to step 406. The method ends when, at step 410, processor 56 determines that the reserved quantity of order 12*a* is not greater than zero. In some embodiments, the method may also end when order 12*a* expires and/or when trading platform 50 receives a cancel order associated with order 12*a*.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus, comprising:
a processor; and
a memory, in which the memory stores software instructions that, when executed by the processor, cause the processor to:
receive, from a trader, a trading order for a particular quantity of a trading product, in which a first portion of the particular quantity is a displayed quantity, and a second portion of the particular quantity is a reserved quantity;
store the trading order in the memory;
identify a decay rule stored in the memory, in which the decay rule is associated with at least one of the trader and the trading product, and in which the decay rule specifies at least one of a decay rate, a time interval, and a decay quantity;
disclose the displayed quantity of the trading order to one or more market centers;
receive a counterorder for another particular quantity of the trading product;
determine that the counterorder matches the trading order;
fill the displayed quantity of the trading order with at least a portion of the another particular quantity of the counterorder;
determine that the reserved quantity of the trading order is greater than zero;
replenish the displayed quantity of the trading order with a portion of the reserved quantity of the trading order, in which a remaining portion of the reserved quantity is left over after replenishing the displayed quantity;
determine that the remaining portion of the reserved quantity of the trading order is greater than zero; and
reduce the remaining portion of the reserved quantity in accordance with the decay rule, in which any replenishing of the displayed quantity of the trading order occurs independently of reducing the remaining portion of the reserved quantity in accordance with the decay rule.

2. The apparatus of claim 1, in which the decay rule specifies at least the decay rate; and in which the decay rate is a variable rate such that the remaining portion of the reserved quantity is reduced at one of a decreasing rate and an increasing rate.

3. The apparatus of claim 1, in which the software instructions, when executed by the processor, further cause the processor to:
upon receiving the trading order from the trader, identify the trader;
identify a trader profile associated with the trader; and
in which identifying the decay rule comprises:
retrieving the decay rule from the trader profile, in which the decay rule is associated with at least the trader.

4. The apparatus of claim 1, in which the decay rule specifies at least the decay rate; in which the decay rate is a first decay rate and the trading product is a first trading product of a plurality of trading products; and in which the software instructions, when executed by the processor, further cause the processor to:
identify a plurality of decay rates, in which each decay rate of the plurality of decay rates is associated with a respective trading product of the plurality of trading products.

5. The apparatus of claim 1, in which the software instructions, when executed by the processor, further cause the processor to:
record at least the reserved quantity of the trading order in an order book; and
in which the decay rule specifies at least the time interval and the decay rate;
and in which reducing the remaining portion of the reserved quantity in accordance with the decay rule comprises:
in response to an expiration of the time interval, deleting at least a portion of the remaining portion of the reserved quantity from the order book.

6. The apparatus of claim 1, in which the decay rule specifies at least the time interval; and
in which receiving the trading order from the trader comprises:
receiving the trading order from the trader at a first time; and
in which the software instructions, when executed by the processor, further cause the processor to:
prior to determining that the remaining portion of the reserved quantity of the trading order is greater than zero, determine that the time interval after the first time has expired.

7. The apparatus of claim 6, in which the decay rule specifies at least the time interval and the decay quantity; and
in which reducing the remaining portion of the reserved quantity in accordance with the decay rule comprises:
in response to determining that the time interval has expired after the first time, subtracting the decay quantity from the remaining portion of the reserved quantity; and
for each successive time interval until the remaining portion of the reserved quantity is zero, in response to an expiration of the successive time interval, subtracting the decay quantity from the remaining portion of the reserved quantity.

8. The apparatus of claim 6, in which the decay rule specifies at least the decay rate and the time interval, and in which the decay rate is a variable decay rate; and
in which reducing the remaining portion of the reserved quantity in accordance with the decay rule comprises:
upon determining that the time interval has expired after the first time, reducing the remaining portion of the reserved quantity by a first quantity; and
in which the software instructions, when executed by the processor, further cause the processor to:
increase the variable decay rate; and
upon an expiration of a successive time interval after the time interval, reduce the remaining portion of the reserved quantity by a second quantity, in which the second quantity is larger than the first quantity.

9. The apparatus of claim 6, in which the decay rule specifies at least the decay rate and the time interval, and in which the decay rate is a variable decay rate; and in which reducing the remaining portion of the reserved quantity in accordance with the decay rule comprises:
upon determining that the time interval has expired after the first time, reducing the remaining portion of the reserved quantity by a first quantity; and
in which the software instructions, when executed by the processor, further cause the processor to:
decrease the variable decay rate; and
upon an expiration of a successive time interval after the time interval, reduce the remaining portion of the reserved quantity by a second quantity, in which the second quantity is smaller than the first quantity.

10. The apparatus of claim 1, in which the software instructions, when executed by the processor, further cause the processor to:
receive, from a second trader, a second trading order for still another particular quantity of the trading product, in which the still another particular quantity of the trading product comprises a second displayed quantity and a second reserved quantity; and
identify a second decay rule, in which the second decay rule is associated with at least the second trader and the trading product, and in which the second decay rule specifies at least a second decay rate; and
cause the second reserved quantity of the second trading order to decay based at least in part on the second decay rate.

11. The apparatus of claim 1, in which the software instructions, when executed by the processor, further cause the processor to:
receive, from a second trader, a second trading order for still another particular quantity of the trading product, in which the still another particular quantity of the trading product comprises a second displayed quantity and a second reserved quantity; and
identify a second decay rule, in which the second decay rule is associated with at least the second trader and the trading product, and in which the second decay rule specifies at least a second decay quantity; and
cause the second reserved quantity of the second trading order to decay based at least in part on the second decay quantity.

12. The apparatus of claim 1, in which the decay rule specifies at least two of the decay rate, the time interval, and the decay quantity.

13. The apparatus of claim 1, in which the decay rule specifies at least the decay rate, the time interval, and the decay quantity.

14. The apparatus of claim 1, in which the decay rule specifies at least the decay rate.

15. The apparatus of claim 1, in which the decay rule specifies at least the time interval.

16. The apparatus of claim 1, in which the decay rule specifies at least the decay quantity.

17. The apparatus of claim 1, in which the decay rule specifies the time interval and at least a second time interval but specifies no decay rate.

18. The apparatus of claim 1, in which the decay rule specifies at least the decay rate but specifies no decay quantity.

19. A method, comprising:
receiving, from a trader, a trading order for a particular quantity of a trading product, in which a first portion of the particular quantity is a displayed quantity, and a second portion of the particular quantity is a reserved quantity;
storing, by a processor of a computer, the trading order in a memory;
identifying, by the processor, a decay rule stored in the memory, in which the decay rule is associated with at least one of the trader and the trading product, and in which the decay rule specifies at least one of a decay rate, a time interval, and a decay quantity;
disclosing the displayed quantity of the trading order to one or more market centers;
receiving a counterorder for another particular quantity of the trading product;
determining, by the processor, that the counterorder matches the trading order;
filling, by the processor, the displayed quantity of the trading order with at least a portion of the another particular quantity of the counterorder;
determining, by the processor, that the reserved quantity of the trading order is greater than zero;
replenishing, by the processor, the displayed quantity of the trading order with a portion of the reserved quantity of the trading order, in which a remaining portion of the reserved quantity is left over after replenishing the displayed quantity;
determining, by the processor, that the remaining portion of the reserved quantity of the trading order is greater than zero; and
reducing, by the processor, the remaining portion of the reserved quantity in accordance with the decay rule, in which any replenishing of the displayed quantity of the trading order occurs independently of reducing the remaining portion of the reserved quantity in accordance with the decay rule.

20. The method of claim 19, in which the decay rule specifies at least the decay rate; and in which the decay rate is a variable rate such that the remaining portion of the reserved quantity is reduced at one of a decreasing rate and an increasing rate.

21. The method of claim 19, further comprising:
upon receiving the trading order from the trader, identifying the trader;
identifying, by the processor, a trader profile associated with the trader; and
in which identifying the decay rule comprises:
retrieving, by the processor, the decay rule from the trader profile, in which the decay rule is associated with at least the trader.

22. The method of claim 19, in which the decay rule specifies at least the decay rate;
in which the decay rate is a first decay rate and the trading product is a first trading product of a plurality of trading products; and
in which the method further comprises:
identifying, by the processor, a plurality of decay rates, in which each decay rate of the plurality of decay rates is associated with a respective trading product of the plurality of trading products.

23. The method of claim 19, further comprising:
recording, by the processor, at least the reserved quantity of the trading order in an order book; and
in which the decay rule specifies at least the time interval and the decay rate;
and in which reducing the remaining portion of the reserved quantity in accordance with the decay rule comprises:
in response to an expiration of the time interval, deleting, by the processor, at least a portion of the remaining portion of the reserved quantity from the order book.

24. The method of claim 19, in which the decay rule specifies at least the time interval; and
in which receiving the trading order from the trader comprises:
receiving the trading order from the trader at a first time; and
in which the method further comprises:
prior to determining that the remaining portion of the reserved quantity of the trading order is greater than zero, determining, by the processor, that the time interval after the first time has expired.

25. The method of claim 24, in which the decay rule specifies at least the time interval and the decay quantity; and
  in which reducing the remaining portion of the reserved quantity in accordance with the decay rule comprises:
    in response to determining that the time interval has expired after the first time, subtracting, by the processor, the decay quantity from the remaining portion of the reserved quantity; and
    for each successive time interval until the remaining portion of the reserved quantity is zero, in response to an expiration of the successive time interval, subtracting, by the processor, the decay quantity from the remaining portion of the reserved quantity.

26. The method of claim 24, in which the decay rule specifies at least the decay rate and the time interval, and in which the decay rate is a variable decay rate; and
  in which reducing the remaining portion of the reserved quantity in accordance with the decay rule comprises:
    upon determining that the time interval has expired after the first time, reducing the remaining portion of the reserved quantity by a first quantity; and
  in which the method further comprises:
    increasing, by the processor, the variable decay rate; and
    upon an expiration of a successive time interval after the time interval, reducing, by the processor, the remaining portion of the reserved quantity by a second quantity, in which the second quantity is larger than the first quantity.

27. The method of claim 24, in which the decay rule specifies at least the decay rate and the time interval, and in which the decay rate is a variable decay rate; and
  in which reducing the remaining portion of the reserved quantity in accordance with the decay rule comprises:
    upon determining that the time interval has expired after the first time, reducing, by the processor, the remaining portion of the reserved quantity by a first quantity; and
  in which the method further comprises:
    decreasing, by the processor, the variable decay rate; and
    upon an expiration of a successive time interval after the time interval, reducing, by the processor, the remaining portion of the reserved quantity by a second quantity, in which the second quantity is smaller than the first quantity.

28. The method of claim 19, further comprising:
  receive, from a second trader, a second trading order for still another particular quantity of the trading product, in which the still another particular quantity of the trading product comprises a second displayed quantity and a second reserved quantity; and
  identifying, by the processor, a second decay rule, in which the second decay rule is associated with at least the second trader and the trading product, and in which the second decay rule specifies at least a second decay rate; and
  causing, by the processor, the second reserved quantity of the second trading order to decay based at least in part on the second decay rate.

29. The method of claim 19, further comprising:
  receive, from a second trader, a second trading order for still another particular quantity of the trading product, in which the still another particular quantity of the trading product comprises a second displayed quantity and a second reserved quantity; and
  identify, by the processor, a second decay rule, in which the second decay rule is associated with at least the second trader and the trading product, and in which the second decay rule specifies at least a second decay quantity; and
  causing, by the processor, the second reserved quantity of the second trading order to decay based at least in part on the second decay quantity.

30. The method of claim 19, in which the decay rule specifies at least two of the decay rate, the time interval, and the decay quantity.

31. The method of claim 19, in which the decay rule specifies at least the decay rate, the time interval, and the decay quantity.

32. An article of manufacture, comprising:
  a non-transitory tangible computer-readable medium, the computer-readable medium storing software instructions that, when executed by a processor, cause the processor to:
    receive, from a trader, a trading order for a particular quantity of a trading product, in which a first portion of the particular quantity is a displayed quantity, and a second portion of the particular quantity is a reserved quantity;
    store the trading order in a memory;
    identify a decay rule stored in the memory, in which the decay rule is associated with at least one of the trader and the trading product, and in which the decay rule specifies at least one of a decay rate, a time interval, and a decay quantity;
    disclose the displayed quantity of the trading order to one or more market centers;
    receive a counterorder for another particular quantity of the trading product;
    determine that the counterorder matches the trading order;
    fill the displayed quantity of the trading order with at least a portion of the another particular quantity of the counterorder;
    determine that the reserved quantity of the trading order is greater than zero;
    replenish the displayed quantity of the trading order with a portion of the reserved quantity of the trading order, in which a remaining portion of the reserved quantity is left over after replenishing the displayed quantity;
    determine that the remaining portion of the reserved quantity of the trading order is greater than zero; and
    reduce the remaining portion of the reserved quantity in accordance with the decay rule, in which any replenishing of the displayed quantity of the trading order occurs independently of reducing the remaining portion of the reserved quantity in accordance with the decay rule.

33. The article of manufacture of claim 32, in which the decay rule specifies at least the decay rate; and in which the decay rate is a variable rate such that the remaining portion of the reserved quantity is reduced at one of a decreasing rate and an increasing rate.

34. The article of manufacture of claim 32, in which the software instructions, when executed by the processor, further cause the processor to:
  upon receiving the trading order from the trader, identify the trader;
  identify a trader profile associated with the trader; and
  in which identifying the decay rule comprises:
    retrieving the decay rule from the trader profile, in which the decay rule is associated with at least the trader.

35. The article of manufacture of claim 32, in which the decay rule specifies at least the decay rate;
in which the decay rate is a first decay rate and the trading product is a first trading product of a plurality of trading products; and
in which the software instructions, when executed by the processor, further cause the processor to:
identify a plurality of decay rates, in which each decay rate of the plurality of decay rates is associated with a respective trading product of the plurality of trading products.

36. The article of manufacture of claim 32, in which the software instructions, when executed by the processor, further cause the processor to:
record at least the reserved quantity of the trading order in an order book; and
in which the decay rule specifies at least the time interval and the decay rate;
and in which reducing the remaining portion of the reserved quantity in accordance with the decay rule comprises:
in response to an expiration of the time interval, deleting at least a portion of the remaining portion of the reserved quantity from the order book.

37. The article of manufacture of claim 32, in which the decay rule specifies at least the time interval; and
in which receiving the trading order from the trader comprises:
receiving the trading order from the trader at a first time; and
in which the software instructions, when executed by the processor, further cause the processor to:
prior to determining that the remaining portion of the reserved quantity of the trading order is greater than zero, determine that the time interval after the first time has expired.

38. The article of manufacture of claim 37, in which the decay rule specifies at least the time interval and the decay quantity; and
in which reducing the remaining portion of the reserved quantity in accordance with the decay rule comprises:
in response to determining that the time interval has expired after the first time, subtracting the decay quantity from the remaining portion of the reserved quantity; and
for each successive time interval until the remaining portion of the reserved quantity is zero, in response to an expiration of the successive time interval, subtracting the decay quantity from the remaining portion of the reserved quantity.

39. The article of manufacture of claim 37, in which the decay rule specifies at least the decay rate and the time interval, and in which the decay rate is a variable decay rate; and
in which reducing the remaining portion of the reserved quantity in accordance with the decay rule comprises:
upon determining that the time interval has expired after the first time, reducing the remaining portion of the reserved quantity by a first quantity; and
in which the software instructions, when executed by the processor, further cause the processor to:
increase the variable decay rate; and
upon an expiration of a successive time interval after the time interval, reduce the remaining portion of the reserved quantity by a second quantity, in which the second quantity is larger than the first quantity.

40. The article of manufacture of claim 37, in which the decay rule specifies at least the decay rate and the time interval, and in which the decay rate is a variable decay rate; and
in which reducing the remaining portion of the reserved quantity in accordance with the decay rule comprises:
upon determining that the time interval has expired after the first time, reducing the remaining portion of the reserved quantity by a first quantity; and
in which the software instructions, when executed by the processor, further cause the processor to:
decrease the variable decay rate; and
upon an expiration of a successive time interval after the time interval, reduce the remaining portion of the reserved quantity by a second quantity, in which the second quantity is smaller than the first quantity.

41. The article of manufacture of claim 32, in which the software instructions, when executed by the processor, further cause the processor to:
receive, from a second trader, a second trading order for still another particular quantity of the trading product, in which the still another particular quantity of the trading product comprises a second displayed quantity and a second reserved quantity; and
identify a second decay rule, in which the second decay rule is associated with at least the second trader and the trading product, and in which the second decay rule specifies at least a second decay rate; and
cause the second reserved quantity of the second trading order to decay based at least in part on the second decay rate.

42. The article of manufacture of claim 32, in which the software instructions, when executed by the processor, further cause the processor to:
receive, from a second trader, a second trading order for still another particular quantity of the trading product, in which the still another particular quantity of the trading product comprises a second displayed quantity and a second reserved quantity; and
identify a second decay rule, in which the second decay rule is associated with at least the second trader and the trading product, and in which the second decay rule specifies at least a second decay quantity; and
cause the second reserved quantity of the second trading order to decay based at least in part on the second decay quantity.

43. The article of manufacture of claim 32, in which the decay rule specifies at least two of the decay rate, the time interval, and the decay quantity.

44. The article of manufacture of claim 32, in which the decay rule specifies at least the decay rate, the time interval, and the decay quantity.

45. The article of manufacture of claim 32, further comprising: the processor.

46. The article of manufacture of claim 32, in which the memory comprises the computer-readable medium.

47. An apparatus, comprising:
a processor; and
a memory, in which the memory stores software instructions that, when executed by the processor, cause the processor to:
receive, from a trader, a trading order for a particular quantity of a trading product, in which a first portion of the particular quantity is a displayed quantity, and a second portion of the particular quantity is a reserved quantity;

store the trading order in the memory;

identify a decay rule stored in the memory, in which the decay rule is associated with at least one of the trader and the trading product, and in which the decay rule specifies at least one of a decay rate, a time interval, and a decay quantity;

disclose the displayed quantity of the trading order to one or more market centers;

determine that the reserved quantity of the trading order is greater than zero;

reduce the reserved quantity in accordance with the decay rule, in which a remaining portion of the reserved quantity is left over after reducing the reserved quantity;

receive a counterorder for another particular quantity of the trading product;

determine that the counterorder matches the trading order;

fill the displayed quantity of the trading order with at least a portion of the another particular quantity of the counterorder;

determine that the remaining portion of the reserved quantity of the trading order is greater than zero; and replenish the displayed quantity of the trading order with a portion of the remaining portion of the reserved quantity of the trading order, in which any replenishing of the displayed quantity of the trading order occurs independently of any reducing of the reserved quantity in accordance with the decay rule.

48. The apparatus of claim 47, in which the decay rule specifies at least the decay rate; and in which the decay rate is a variable rate such that the reserved quantity is reduced at one of a decreasing rate and an increasing rate.

49. The apparatus of claim 47, in which the software instructions, when executed by the processor, further cause the processor to:

upon receiving the trading order from the trader, identify the trader;

identify a trader profile associated with the trader; and in which identifying the decay rule comprises:

retrieving the decay rule from the trader profile, in which the decay rule is associated with at least the trader.

50. The apparatus of claim 47, in which the decay rule specifies at least the decay rate;

in which the decay rate is a first decay rate and the trading product is a first trading product of a plurality of trading products; and in which the software instructions, when executed by the processor, further cause the processor to:

identify a plurality of decay rates, in which each decay rate of the plurality of decay rates is associated with a respective trading product of the plurality of trading products.

51. The apparatus of claim 47, in which the software instructions, when executed by the processor, further cause the processor to:

record at least the reserved quantity of the trading order in an order book; and in which the decay rule specifies at least the time interval and the decay rate;

and in which reducing the reserved quantity in accordance with the decay rule comprises:

in response to an expiration of the time interval, deleting a portion of the reserved quantity from the order book such that the remaining portion of the reserved quantity is left over.

52. The apparatus of claim 47, in which the decay rule specifies at least two of the decay rate, the time interval, and the decay quantity.

53. A method, comprising:

receiving, from a trader, a trading order for a particular quantity of a trading product, in which a first portion of the particular quantity is a displayed quantity, and a second portion of the particular quantity is a reserved quantity;

storing, by a processor of a computer, the trading order in a memory;

identifying, by the processor, a decay rule stored in the memory, in which the decay rule is associated with at least one of the trader and the trading product, and in which the decay rule specifies at least one of a decay rate, a time interval, and a decay quantity;

disclosing the displayed quantity of the trading order to one or more market centers;

determining, by the processor, that the reserved quantity of the trading order is greater than zero;

reducing, by the processor, the reserved quantity in accordance with the decay rule, in which a remaining portion of the reserved quantity is left over after reducing the reserved quantity;

receiving a counterorder for another particular quantity of the trading product;

determining, by the processor, that the counterorder matches the trading order;

filling, by the processor, the displayed quantity of the trading order with at least a portion of the another particular quantity of the counterorder;

determining, by the processor, that the remaining portion of the reserved quantity of the trading order is greater than zero; and replenishing, by the processor, the displayed quantity of the trading order with a portion of the remaining portion of the reserved quantity of the trading order, in which any replenishing of the displayed quantity of the trading order occurs independently of any reducing of the reserved quantity in accordance with the decay rule.

54. The method of claim 53, in which the decay rule specifies at least the decay rate; and in which the decay rate is a variable rate such that the reserved quantity is reduced at one of a decreasing rate and an increasing rate.

55. The method of claim 53, further comprising:

upon receiving the trading order from the trader, identifying the trader;

identifying, by the processor, a trader profile associated with the trader; and in which identifying the decay rule comprises:

retrieving, by the processor, the decay rule from the trader profile, in which the decay rule is associated with at least the trader.

56. The method of claim 53, in which the decay rule specifies at least the decay rate;

in which the decay rate is a first decay rate and the trading product is a first trading product of a plurality of trading products; and in which the method further comprises:

identifying, by the processor, a plurality of decay rates, in which each decay rate of the plurality of decay rates is associated with a respective trading product of the plurality of trading products.

57. The method of claim 53, further comprising:
recording, by the processor, at least the reserved quantity of the trading order in an order book; and
in which the decay rule specifies at least the time interval and the decay rate;
and in which reducing the reserved quantity in accordance with the decay rule comprises:
in response to an expiration of the time interval, deleting, by the processor, a portion of the reserved quantity from the order book such that the remaining portion of the reserved quantity is left over.

58. The method of claim 53, in which the decay rule specifies at least two of the decay rate, the time interval, and the decay quantity.

59. An article of manufacture, comprising:
a non-transitory tangible computer-readable medium, the computer-readable medium storing software instructions that, when executed by a processor, cause the processor to:
receive, from a trader, a trading order for a particular quantity of a trading product, in which a first portion of the particular quantity is a displayed quantity, and a second portion of the particular quantity is a reserved quantity;
store the trading order in a memory;
identify a decay rule stored in the memory, in which the decay rule is associated with at least one of the trader and the trading product, and in which the decay rule specifies at least one of a decay rate, a time interval, and a decay quantity;
disclose the displayed quantity of the trading order to one or more market centers;
determine that the reserved quantity of the trading order is greater than zero;
reduce the reserved quantity in accordance with the decay rule, in which a remaining portion of the reserved quantity is left over after reducing the reserved quantity;
receive a counterorder for another particular quantity of the trading product;
determine that the counterorder matches the trading order;
fill the displayed quantity of the trading order with at least a portion of the another particular quantity of the counterorder;
determine that the remaining portion of the reserved quantity of the trading order is greater than zero; and
replenish the displayed quantity of the trading order with a portion of the remaining portion of the reserved quantity of the trading order, in which any replenishing of the displayed quantity of the trading order occurs independently of any reducing of the reserved quantity in accordance with the decay rule.

60. The article of manufacture of claim 59, in which the decay rule specifies at least the decay rate; and in which the decay rate is a variable rate such that the reserved quantity is reduced at one of a decreasing rate and an increasing rate.

61. The article of manufacture of claim 59, in which the software instructions, when executed by the processor, further cause the processor to:
upon receiving the trading order from the trader, identify the trader;
identify a trader profile associated with the trader; and
in which identifying the decay rule comprises:
retrieving the decay rule from the trader profile, in which the decay rule is associated with at least the trader.

62. The article of manufacture of claim 59, in which the decay rule specifies at least the decay rate;
in which the decay rate is a first decay rate and the trading product is a first trading product of a plurality of trading products; and
in which the software instructions, when executed by the processor, further cause the processor to:
identify a plurality of decay rates, in which each decay rate of the plurality of decay rates is associated with a respective trading product of the plurality of trading products.

63. The article of manufacture of claim 59, in which the software instructions, when executed by the processor, further cause the processor to:
record at least the reserved quantity of the trading order in an order book; and in which the decay rule specifies at least the time interval and the decay rate;
and in which reducing the reserved quantity in accordance with the decay rule comprises:
in response to an expiration of the time interval, deleting a portion of the reserved quantity from the order book such that the remaining portion of the reserved quantity is left over.

64. The article of manufacture of claim 59, in which the decay rule specifies at least two of the decay rate, the time interval, and the decay quantity.

65. The article of manufacture of claim 59, further comprising:
the processor.

66. The article of manufacture of claim 59, in which the memory comprises the computer-readable medium.

* * * * *